United States Patent [19]

Yagi

[11] 4,259,133

[45] Mar. 31, 1981

[54] METHOD AND APPARATUS FOR MAKING PROFILE SHEETS

[75] Inventor: Seiichi Yagi, Kyoto, Japan

[73] Assignee: Minigrip, Inc., Orangeburg, N.Y.

[21] Appl. No.: 714,369

[22] Filed: Aug. 16, 1976

Related U.S. Application Data

[63] Continuation-in-part of Ser. No. 340,830, Mar. 13, 1973, abandoned, and a continuation-in-part of Ser. No. 608,900, Aug. 29, 1975, abandoned.

[51] Int. Cl.³ ............................................. B29D 7/02
[52] U.S. Cl. .................................. 156/244.11; 156/91; 156/498; 156/500; 425/114; 425/381; 425/382 R; 425/462; 425/463; 425/464
[58] Field of Search ................... 156/244, 500, 91, 92, 156/498; 425/113, 114, 131, 133.5, 375, 376, 379.6, 381, 382, 461, 462, 463, 464, 465, 466; 264/167, 171, 177 R, 176 R

[56] References Cited

U.S. PATENT DOCUMENTS

| | | | |
|---|---|---|---|
| 3,111,715 | 11/1963 | Hofer | 425/105 |
| 3,198,228 | 8/1965 | Naito | 156/244 |
| 3,462,332 | 8/1969 | Goto | 156/244 |
| 3,474,495 | 10/1969 | Deutsch et al. | 425/381 |
| 3,543,379 | 12/1970 | Naito | 156/91 |

*Primary Examiner*—Caleb Weston
*Attorney, Agent, or Firm*—Hill, Van Santen, Steadman, Chiara & Simpson

[57] ABSTRACT

A method and mechanism for continuously making film with one or more fastener profiles thereon to be used for making reclosable plastic bags. The film is extruded through a T-shaped head having a thin slot die opening, and at least one fastener profile is extruded through a preform die block positioned so that the film and profile will engage and fuse to each other while the plastic is still in the state of fusion. The die block is mounted adjustably to be moved into different positions along the film head with the positions varying across the film width to control the location of the profile relative to the edges of the film or relative to other profiles on the film, with the width of the film also being controllable.

35 Claims, 11 Drawing Figures

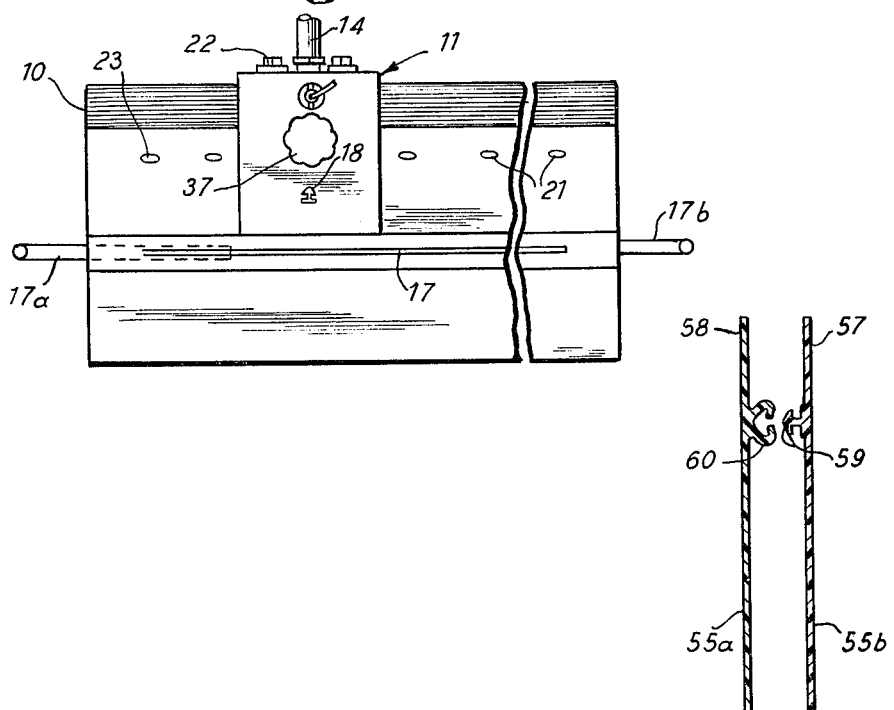
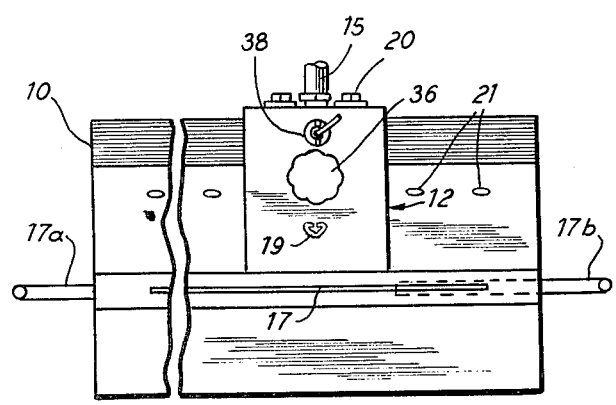

METHOD AND APPARATUS FOR MAKING PROFILE SHEETS

This is a continuation-in-part of copending applications Ser. No. 340,830, filed Mar. 13, 1973, and Ser. No. 608,900 filed Aug. 29, 1975, both now abandoned.

BACKGROUND OF THE INVENTION

The invention relates to improvements in a mechanism and method of continuously making thermoplastic film having fastener profiles on the surface thereof and more particularly wherein the temperature of the plastic for the profiles and film, and the delivery of the plastic can be individually controlled and wherein the dimensions of the film and the location of the profiles can be rapidly and simply changed without requiring additional separate die heads.

This type of thermoplastic film with fastener profiles on the surface is used for lightweight reclosable bags which vary in size and gauge in accordance with the product to be packaged therein and also vary in that the original bags may be open at the bottom or at the top depending upon the contents and the filling procedure used. To form these bags a thin thermoplastic film is first extruded in a continuous film length with fastener profiles on the surface. After cooling the film is then folded by being doubled along its center so that the fastener profiles are brought together, and the fastener profiles may be pressed together to be joined or left separated. The bags are formed by cross-sealing and cross-cutting the film in predetermined lengths dependent upon the width of the bag to be obtained. The height of the bag is determined by the width of the film sheet which is extruded, and the location of the fastener profiles is determined by their position relative to the edge of the film. Should a bottom open bag be desired, the profiles will be placed near the center of the film and the height of the bag will be determined by the distance from the profiles to the edge of the film. The film is produced from various types of thermoplastic resins or combinations of same such as, for example, polyethylene (high or low density), polypropylene, polystyrene, polyvinyl chloride (hard and soft), polyvinylidine chloride, cellulose acetate, polyesters, etc. The plastic is chosen to have optimum characteristics for the bag usually requiring clarity and resiliency, or in the case of combined (coextruded) films for their different barrier properties. By separately extruding the profiles and attaching them in the fused state, plastic of optimum characteristics for the profiles can be chosen substantially independent of the plastic of the bag. For example, a more stiff, and slippery plastic is better suited to the formation of profiles to the bag material. Also, plastic of different colors may be employed. After the profiles and film are brought together in the fusible state, they are subjected to cooling.

In certain instances, it may be desirable to form a sheet of plastic with a single profile extending therealong. Such a sheet can be utilized, for example, in the forming of bags by placing it in face-to-face relationship with another sheet with the profiles in alignment, and the sheets sealed along the side and bottom edges to form an open bag.

It is accordingly an object of the present invention to provide an improved mechanism and method for extrusion of a film and extrusion of profiles positioned on the surface wherein the location of the profiles relative to the width of the plastic sheet can be quickly, easily and simply changed without requiring the exchange of die heads and other equipment and hence the necessity of a large stock of dies to accommodate the many bag heights required.

A further object of the invention is to provide an improved plastic extrusion mechanism of the type described wherein a greater dexterity is obtainable in the control of the temperature and amount of plastic delivered to the film extrusion slot and the profile extrusion openings to thereby improve the quality of the product obtained therefrom.

A still further object of the invention is to provide an extrusion mechanism for providing profile sheets wherein the various demands of different types of bags can be readily and quickly accommodated without any great loss in downtime such as those affecting the width of the sheet, the location of the profiles and the nature and conditions of extrusion of the plastic.

A further object of the invention is to provide a method of and apparatus for extruding a sheet and attaching a single profile or a plurality of profiles thereto, and more easily controlling the location of the profile or profiles relative to the edge of the sheet;

Other objects, advantages and features will become more apparent, as will equivalent methods and mechanisms which are intended to be covered herein, from the teaching of the principles of the invention in the description of the preferred embodiments of the specification, claims and drawings, in which:

DESCRIPTION OF THE DRAWINGS

FIG. 9 is an elevational view, with portions removed for clarity, of an extruder illustrating mechanism for forming and attaching a male profile to a sheet;

FIG. 10 is an elevational view similar to FIG. 9 illustrating the attachment of a female profile to a sheet; and FIG. 11 is a sectional view showing two sheets such as formed by the apparatus of FIGS. 9 and 10 in face-to-face relationship as they may be utilized for a bag.

DESCRIPTION OF THE PREFERRED EMBODIMENTS

Figure 1:
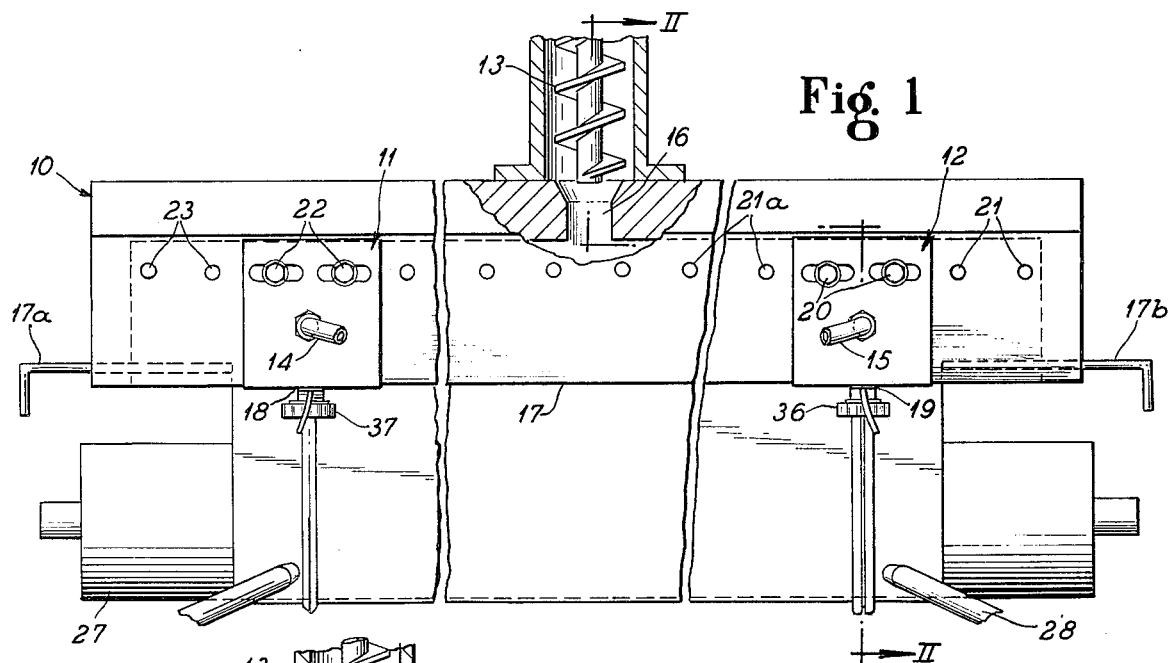
FIG. 1 is a schematic plan view of an extrusion mechanism constructed and operating in accordance with the principles of the present invention.
Figure 2:
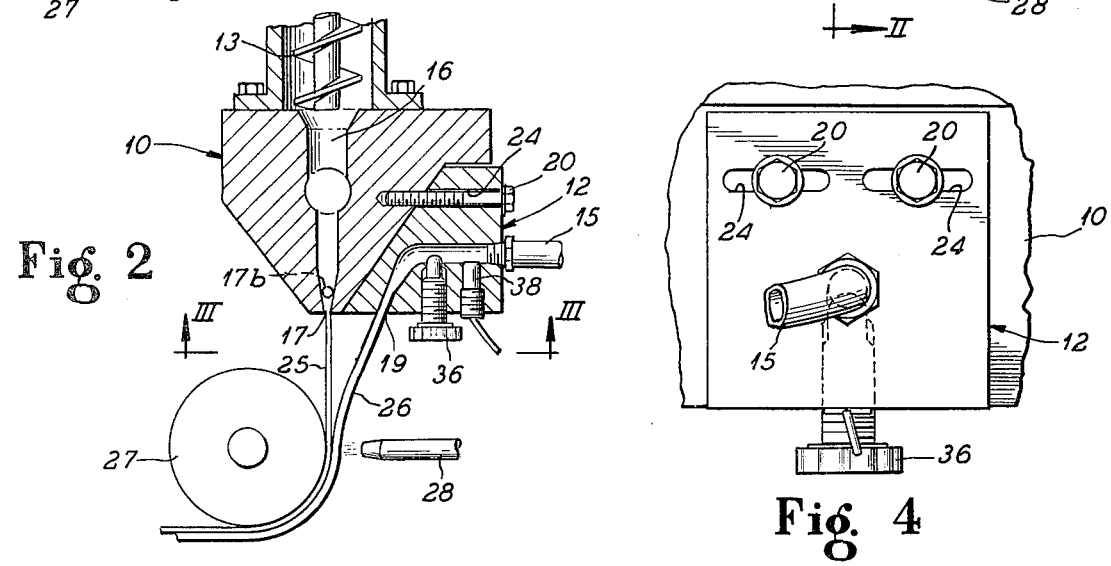
FIG. 2 is a somewhat schematic sectional view taken substantially along line II—II of FIG. 1.
Figure 3:
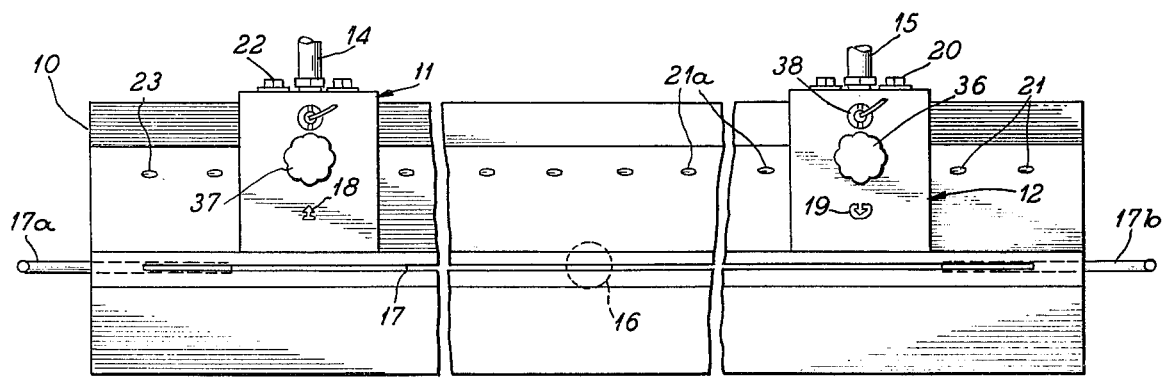
FIG. 3 is an elevational view taken substantially from the direction indicated at III—III in FIG. 2.

FIGS. 1 through 3 show an extruding mechanism for continuously forming film with fastener profiles thereon including a film extruding head 10 which has a thin slot die opening 17 from which the continuous sheet of film emerges.

Plastic is supplied from an extruder 13. A single extruder may be employed, as will be described in connection with FIG. 5, or separate extruders which will be described in connection with FIG. 6. In FIG. 1 the extruder 13 delivers fused plastic through the passage 16 to the film die opening 17.

Preformed profiles are extruded from preform die blocks 11 and 12 which are mounted on the film extruding head 10. The die blocks have shaped profile ports or openings 18 and 19 as shown in FIG. 3. The opening 18 is shaped to provide a male element and the opening 19 a female element, and these openings are related so that rib and groove profile elements will emerge of a size and shape to releasable interlock with each other when pressed together. The profiles emerge from their die openings 18 and 19 to substantially immediately engage the emerging thin sheet of film, while the plastic is in the fused state. The plastic of the base of the profiles and of the surface of the film immediately merge and fuse to each other as shown in FIG. 2. The profiles thus positioned on the film are immediately cooled with the film passing over a chill roll 27. Jets of coolant such as provided by the coolant supply 28 are directed against the male and female profiles. By positioning of the chill roll 27 and jets 28, adequate time for the plastic of the profiles and film to fuse is afforded and as soon as that fusion occurs, heat is immediately removed from the plastic to affix the profiles to the film in the fused state while retaining accurately the shape of the profiles that have emerged from the profiled die block openings.

Plastic is delivered to the profiled die block openings through flexible tubes 14 and 15. Separate choke valves 36 and 37 control plastic flow to the profile openings. Separate heaters such as 38 and 38a are used to separately regulate the temperature of plastic delivered to the profile openings.

Figure 4:
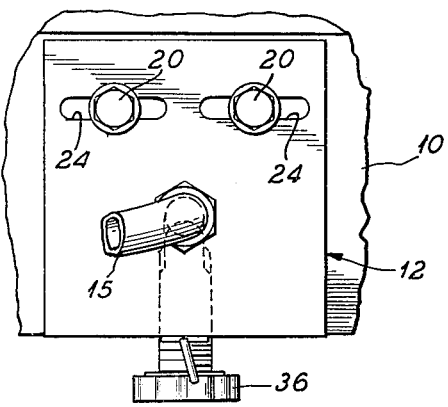
FIG. 4 is a detailed view of the profile extruder die block.

The preform die blocks 11 and 12 are secured in their laterally adjusted positions, i.e. in the direction of the length of the die opening 17, by attaching means 20 and 22. These attaching means are in the form of cap screws extending through openings such as 24 in the blocks 11 and 12, FIG. 2, and threaded into primary selected adjusted position openings in the film die head 10. The primary position openings are positioned at spaced intervals laterally along the film die head 10 as illustrated by the openings 21 and 23. To adjust the position of the preform die block 12, the cap screws 20 will be loosened and removed, and the die block 12 moved laterally inwardly or outwardly on the film head to a selected primary position. If moved outwardly, the cap screws will be threaded into outward openings such as 21 or 23. If moved inwardly, they will be threaded into openings such as 21a. Thus, as many selected primary adjustment positions exist as there are tapped openings in the film head, and additional secondary lateral adjustment is provided by having elongated slots, in the die block 12 FIG. 4, for the openings 24 through which the cap screws pass.

The slots 24 are of a length so that they will permit a substantial range of lateral secondary adjustment of the preform die blocks to the location of the next tapped opening. In other words, the die blocks can be positioned accurately at any location laterally along the film die head in order to position the profiles at any location relative to the edge of the film. The separate flexible supply tubes 14 and 15 connected to each of the shiftably adjustable preform die blocks for separately supplying each of the die blocks with fused plastic contributes substantially to the adjustability of the die blocks because the tubes 14 and 15 flexibly accommodate themselves to any adjusted positions of the die blocks to which the tubes are connected.

Adjustment of the width of the film is also permitted by wire choke rods 17a and 17b. These choke rods are mounted so that they can be slipped laterally to block the outward portions of the die slot 17 to adjust the length of the die slot opening to control the width of the film extruded from the die slot opening.

Thus, the maximum width of the film will be determined by the overall width of the die head 10, and within this maximum, the film width can be narrowed to any smaller size. Also, the profiles can be quickly and easily located at any location along the surface of the film. Heretofore, in order to change the location of the profiles so as to produce a different depth bag, it was necessary to change to a different die, since the profiles were part of the film die. This, of course, then required a shut-down period for each change, thereby increasing the cost of operation because of the lost time and the necessity of cleaning the changed die. Also this involved the expense of providing many extra dies, which is unnecessary with the present method and mechanism.

It will be understood that the profile film can be made multilayered by extruding an additional sheet of plain film and laying it against the layer of film shown. For example, in FIG. 2 an additional head will be provided to extrude another layer of film parallel to the layer 25 and having the second layer merge with 25 prior to engagement with the chill roll. The second, or outer layer, will then be cooled by direct contact with the chill roll 27 and the layer 25 will be cooled by the conduction of heat through the outer layer to the chill roll and the resulted material will be a laminated multi-layered profile sheet.

Figure 7:
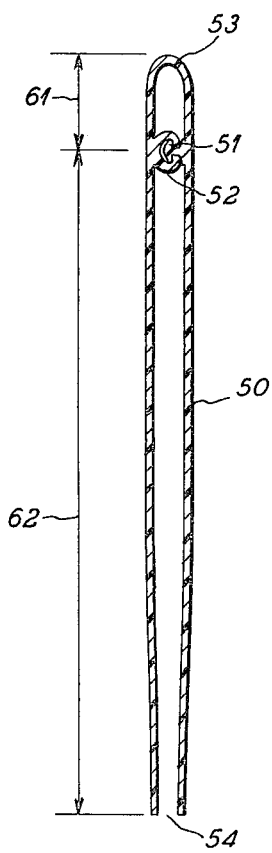
FIGS. 7 and 8 are illustrations showing two different types of bags capable of being formed by the mechanism of the invention.
Figure 8:
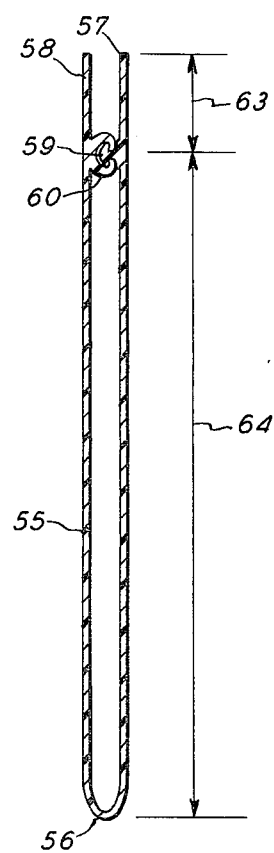

FIGS. 7 and 8 illustrate cross-sectional views of bags formed from profile films. The bag 50 of FIG. 7 is an open bottom bag which is filled through the separated bottom edges 54. The top of the bag 53 is folded so that it provides a pilfer proof seal. In other words the bag cannot be used until the top is cut open or torn off along a line of weakened resistance, and this type of bag is totally and tightly sealed from dust and dirt until it is eventually used and provides a visual indication of whether or not the bag has been tampered with. For this type of bag, the male and female profiles 51 and 52 are positioned close to the center of the original film, that is, a distance two times the dimension 61 which is the distance the profiles are located from the top of the bag. In other words, the profiles are spaced a distance 62 from the edges of the film.

In the type of bag 55 shown in FIG. 8, the bag is filled from the top. The film is folded at its center 56 to form the bag bottom. The profiles are located inwardly from the edges of the film a distance 63. Above the male profile 59 and the female profile 60 are flanges 57 and 58 which are pulled apart to separate the interlocking profiles 59 and 60 when the bag is to be opened. As will be observed, different requirements of bags of the type shown in FIGS. 7 and 8 will require different locations of the profiles which can rapidly and easily be accommodated with the mechanism above described. Additionally more than one set of profiles may be attached to the film die so as to produce more than one series of bags from the resulting multiple profile film.

Figure 5:
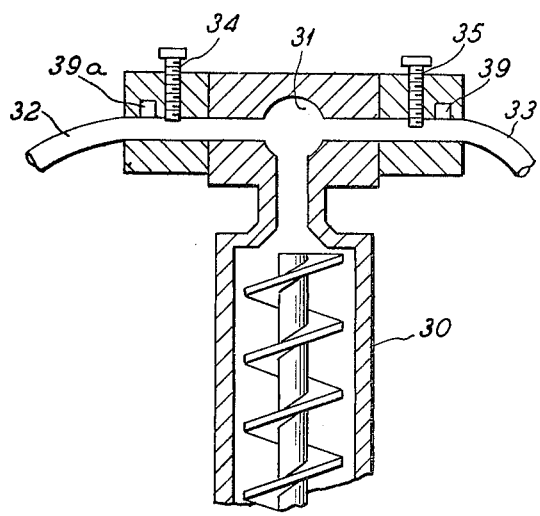
FIG. 5 is a sectional view illustrating a portion of the extrusion mechanism.

FIG. 5 shows an arrangement wherein a single extruder 30 supplies plastic both to the film extruding head and the preform extruding blocks. Plastic extrudate is delivered to the dividing chamber 31 from which it flows to the film slot. It also flows in both directions through line 32 and line 33 leading to the preform die blocks. Separate flow control valves are provided as illustrated by the choke valve 34 controlling the flow to the line 32 and the choke valve 35 controlling the flow to the line 33. An additional choke valve not shown may be located in the line to the film slot.

While the plastic extrudate is in the molten form, additional control of the heat for the profiles can be obtained by separate heaters 39a for the line 32 and 39 for the line 33 and additional separately controlled heaters not shown are provided for the head 10 and its film slot. Due generally to their different characteristics, differences in temperature between the film and profiles are necessary. The profiles having greater thickness will cool more slowly than the film so usually it is desirable to have the profiles at a lower temperature than the film, and this is provided by the separate heaters 38a and 38 as well as 39a and 39 which will be provided with separate thermostatic regulators to obtain accurate plastic profile temperature.

Figure 6:
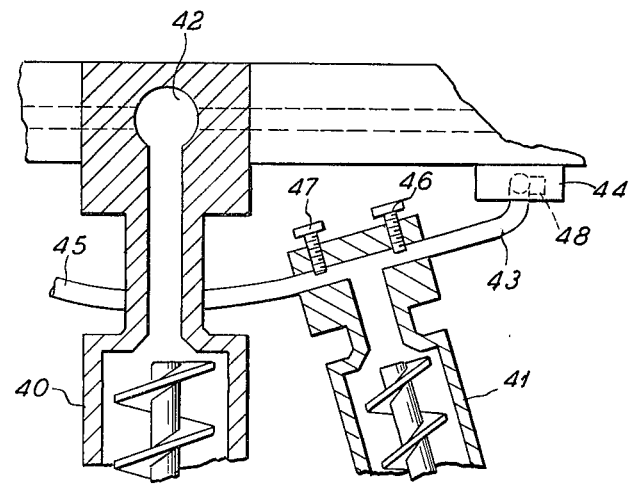
FIG. 6 is a sectional view illustrating another form of the extrusion mechanism.

In the construction of FIG. 6, separate plastic supply extruders are provided shown at 40 and 41. The extruder 40 delivers plastic for the film die with the plastic flowing out through the line 42 which distributes it to the die opening. The plastic from the extruder 41 delivers plastic to the profile blocks through lines 43 and 45. A balance between these two lines can be obtained by separate choke valves 46 and 47 respectively for the lines 43 and 45.

In addition the separate profile die blocks are provided with their individual temperature controls to control the temperature of the plastic emerging therefrom separately from that of the film. This is illustrated by a heater 48 for the profile die block 44, and a similar heat control, not shown, will be provided for the die block which is supplied by the line 45. As above indicated, the plastic for the profiles may be of different physical characteristics than the plastic for the film, and this is readily accomplished by the separate extruders 40 and 41, as well as the separate temperature and flow controls on the preform profile die blocks. Also, because of the difference in the shape and size of the male and female profile elements, different flow conditions and temperatures for each profile have been found to give more uniform and better controlled profile shapes, and this is also achieved by the separate valves and heat controls on the preform profile die blocks.

In FIGS. 9 through 11, parts similar in construction to FIGS. 1 through 8 are given similar numbers. The film die head 10 extrudes a sheet of film through the opening 17 with its width being controlled by side controls 17a and 17b. Mounted on the die head is a movable dieblock 11 supplied with fluid heated plastic through a supply tube 14. The die block has a die opening 18 shaped to form a male fastener profile. The die block 11 is adjustable across the width of the die head to control the location where the profile emerging from the opening 18 will be laid on the sheet. Major adjustments are accomplished by setting the block in accordance with the spacing of the holes such as 21 and minor adjustments are made by the cap bolts 22 in the manner described in connection with the arrangement of FIGS. 1 through 8. Thus, not only can the width of the sheet be adjusted, but the location of the profile which emerges from 18 can be adjusted to any position relative to either edge of the sheet.

In FIG. 10 the die head 10 has mounted thereon a movable die block 12 which has an opening 19 shaped to form a female profile of a size and shape so that the profile will releasably interlock with the profile formed from the block of FIG. 9. The width of the sheet emerging from the die opening 17 is adjustable by the adjustment devices 17a and 17b. In this arrangement, the female die block 17 can be adjusted so that the female profile can be in any location relative to either edge of the sheet.

The sheets are shown in confronting relationship in FIG. 11 with the male profile 59 opposite the female profile 60, and the sheets will form sidewalls 55a and 55b with the bag. By bringing two such sheets in confronting relationship and forming spaced cross-seals and cutting at the cross-seals, bags can be formed with the lower edges of the sheets sealed to form the bottom of the bag. Inasmuch as the profiles can be located independently, the projections 57 and 58 above the profiles can be controlled as to their length so that if one of these flanges is to be longer than the other for ease of gripping and opening the bag, this is controlled by controlling the location of the profile on the sheet. Other purposes and arrangements will be apparent to those versed in the art insofar as additional profiles on each of the sheets which may be attached by other means, and other uses and purposes for the disclosed arrangement and method will be apparent to those versed in the art.

I claim as my invention:

1. A mechanism for continuously forming film with fastener profiles thereon comprising in combination:

film extruding means having a head with an elongate thin slot die opening for extruding a thin film for a bag body;

first and second profile preform extruding die blocks formed as separate elements from each other and separate from said head;

said die blocks having die openings shaped to form male and female releasably interlocking profile fastener elements, said die openings positioned so that the profile elements will engage the surface of the film while the film and profiles are still in a state of fusion and will fuse to each other;

each of said die blocks being selectively adjustably movably positionable relative to said head and to one another lengthwise along said slot die opening;

attaching means for separately connecting each of the preform die blocks to the film head and permitting adjustment of each of the preform die bocks independently of one another and relative to each other lengthwise along said slot die opening to vary the position of the preform die blocks in a direction across the width of the film surface so that the position of the profiles on the film can be changed relative to the longitudinal sides of the film respective to requirements of bags to be formed from the film;

a separate flexible supply tube connected to each of said die blocks for separately supplying each of said die blocks with fused plastic;

said tubes flexibly accommodating themselves to any adjusted position of the die blocks to which connected;

and means for cooling the film and profiles.

2. A mechanism for continuously forming film with fastener profiles thereon constructed in accordance with claim 1:

wherein said attaching means provide a plurality of mounting positions located on the film die head with said positions spaced laterally relative to the direction of film travel and longitudinally relative to said slot die opening.

3. A mechanism for continuously forming film with fastener profiles thereon constructed in accordance with claim 2:
wherein said mounting positions are provided by bolts and openings arranged for fixedly securing the blocks to the film head.

4. A mechanism for continuously forming film with fastener profiles thereon constructed in accordance with claim 3:
wherein the openings have elongate slots extending in a direction of the adjustment of the preform heads for varying the position of the heads for each mounting position.

5. A mechanism for continuously forming film with fastener profiles thereon constructed in accordance with claim 1:
wherein the preform die blocks carry thereon separate plastic flow rate control means controllable independently from the plastic flow rate to the film extruding head.

6. A mechanism for continuously forming film with fastener profiles thereon constructed in accordance with claim 1:
wherein a single extruder is provided and has lines connected separately to the film extruding head and to each profile preform extruding die block to provide a separate flow of plastic to each location.

7. A mechanism for continuously forming film with fastener profiles thereon constructed in accordance with claim 6:
and including a choke valve means for controlling the flow through the preform die blocks.

8. A mechanism for continuously forming film with fastener profiles thereon constructed in accordance with claim 6:
including first and second choke valves respectively positioned in the plastic flow stream to the film head and to the preform die blocks to independently control the flow of plastic thereto.

9. A mechanism for continuously forming film with fastener profiles thereon constructed in accordance with claim 1:
and including first and second extrusion plastic supply means for delivering a supply of fused plastic respectively to said film head and to said preform die blocks so as to provide separate supplies of plastic thereto.

10. A mechanism for continuously forming film with fastener profiles thereon constructed in accordance with claim 1:
including a plastic heat control means connected to the profile preform extruding means for controlling the temperature of the plastic delivered to the preform die blocks.

11. A mechanism for continuously forming film with fastener profiles thereon constructed in accordance with claim 1:
including first and second separate heat control means respectively connected to the film extruding means and the preform extruding means for separately individually controlling the temperature of plastic delivered thereto.

12. A mechanism for continuously forming film with fastener profiles thereon constructed in accordance with claim 1:
and including a separate heater for at least one of said film extruding means and profile preform extruding means so that optimum heating of each plastic extrudate can be obtained.

13. A mechanism for continuously forming film with fastener profiles thereon constructed in accordance with claim 1:
including flexible conduit means leading to each of said profile preform die blocks for supplying plastic thereto and accommodating the movement required by the adjustment of the position of the die blocks.

14. A mechanism for continuously forming film with fastener profiles thereon constructed in accordance with claim 1:
including a second profile preform extruding means having third and fourth preform die blocks with die openings shaped to respectively form male and female releasably interlocking profile elements, said die openings positioned so that the profile elements will engage the surface of the film while the film and profiles are still in a state of fusion and will fuse to each other;
attaching means for connecting the second set of preform blocks to the film head and operative to vary the position of the preform blocks independent of each other and of the first and second preform die blocks in a direction laterally along the film surface so that the position of the profiles on the film can be changed and so that a film will be formed with two sets of male and female interlocking elements to form a sheet that can be used to be divided and form separate sheets;
and means for cooling the third and fourth profiles.

15. A mechanism for continuously forming film with fastener profiles thereon constructed in accordance with claim 14:
including means for controllably varying the width of the film.

16. A mechanism for continuously forming film with fastener profiles thereon comprising:
film extruding means having a head with an elongate thin slot die opening for extruding a thin film for a bag body;
a profile preform extruding means having separate first and second preform die blocks located adjacent to respective opposite ends of said slot die opening and provided with respective die openings shaped to form male and female releasably interlocking profile elements, said die openings positioned so that the profile elements will engage the surface of the film while the film and profile are in a state of fusion and will fuse to each other;
means for cooling the film and profile;
width control means at the edge of the film head for controlling the length of said slot die opening and thereby reducing or increasing the width of the film extruded therefrom;
attaching means for separately connecting each of the preform die blocks to the film head permitting adjustment of each of the preform die blocks independently of one another and relative to each other to vary the position of the preform die blocks in a direction longitudinally along said slot die opening and laterally along the film surface so that the position of the profiles on the film, as well as the width of the film, can be changed responsive to requirements of the bag to be formed from the film;

and a separate flexible supply tube connected to each of said die blocks for separately supplying each of said die blocks with fused plastic;

said tubes flexibly accommodating themselves to any adjusted position of the die blocks to which connected.

17. A mechanism for continuously forming film with fastener profiles thereon constructed in accordance with claim 16:

including second film extruding means having a head with a thin elongated slot die opening for extruding a thin second film prepositioned to lay the second film against the first film so that they are acted on together by said cooling means.

18. A mechanism for continuously forming film with fastener profiles thereon constructed in accordance with claim 16:

wherein thin rods extend adjustably into the ends of the slot die opening for blocking the opening from the ends to reduce the width of the film extruded therefrom.

19. A mechanism for continuously forming plastic film having a fastener profile thereon comprising in combination:

plastic film extruding means having a head with an elongate thin slot die opening for extruding a thin film;

a profile preform extruding means having a die block which is formed separately from said head and is provided with a shaped profile die opening positioned so that a plastic profile extruded therefrom will engage the film from the film die opening while the film and profile plastics are in a state of fusion and will fuse to each other;

attaching means for adjustably connecting and mounting the preform profile die block along a longitudinal area substantially parallel to said slot die opening on the film head to preadjust the position of the die block along the length of said slot die opening to determine the desired transverse location of the profile on the film relative to the longitudinal side edges of the film;

means for cooling the film and profile;

and a flexible supply tube connected to said die block for supplying it with fused plastic;

said tube flexibly accommodating itself to any adjusted position of the die block longitudinally relative to the slot die opening.

20. A mechanism for continuously forming fastener profile film constructed with claim 19:

including means controlling the plastic delivery to the film head and to the preform die block independently of each other.

21. A mechanism for continuously forming fastener profile film constructed in accordance with claim 19:

including means delivering plastic to the film die head and the preform profile die block from separate extruders.

22. A mechanism for continuously forming fastener profile film constructed in accordance with claim 19:

including means controlling the temperature of the plastic of the film and the plastic of the profile independently of each other.

23. A mechanism for continuously forming fastener profile film comprising in combination:

film extruding means having a head with an elongate thin slot die opening for extruding a thin film;

a profile preform extruding means having a die block formed separately from said head and provided with a shaped profile die opening positioned so that a profile extruded therefrom will engage the film from the film die opening while the film and profile plastics are in a state of fusion and will fuse to each other;

means for adjustably mounting the separately formed preform profile die block on the film head in a plurality of selective primary positioned to preadjust its position generally relative to and longitudinally along said slot die into the desired location of the profile on the film;

means for cooling the film and profile;

and means for effecting secondary shifting adjustments of the die block relative to said slot die in any of the primary preadjusted positions.

24. A mechanism according to claim 23, wherein both said primary position preadjustment means and said secondary shifting adjustment means are oriented in the direction of the length of said thin slot die opening so that the primary position adjustments and secondary shifting adjustments of the die block are effected in the direction of the length of the thin slot die opening.

25. A mechanism for continuously forming profile film comprising in combination:

film extruding means having a head with an elongate thin slot die opening for extruding a thin film;

a profile preform extruding means having a die block with a shaped profile die opening positioned so that a profile extruded therefrom will engage the film from the film die opening while the film and profile plastics are in a state of fusion and will fuse to each other;

means for adjustably mounting the preform profile die block on the film head to preadjust its position relative to the die slot and determine the desired location of the profile on the film;

means for cooling the film and profile;

and width control means at an end of the slot die opening in the film head adjustable relative to the film head for adjusting the length of said thin slot die opening so as to reduce or increase the width of the thin film extruded from said thin slot die opening.

26. A mechanism for continuously forming fastener profile film constructed in accordance with claim 25:

wherein said width control means includes a thin rod extending adjustably into the end of the slot opening for changing the length of said slot.

27. The method of continuously forming film having fastener profiles thereon which comprises:

extruding film from a film head through an elongated thin slot die opening in the head;

separately extruding a shaped profile from a profile port of a first preform profile die block at a location so that the profile will engage the film while the plastic of the film and profile are still in a state of fusion and will fuse to each other;

separately extruding a second shaped profile from a profile port of a second preform profile die block separate from said first block and disposed at a location so that the second profile will engage the film while the plastic of the film and profile are still in a state of fusion to each other;

separately supplying each of said die blocks with fused plastic through a separate flexible supply tube connected to each of the die blocks;

adjustably positioning the location of each of the die blocks independently of one another and relative to each other and relative to the slot die opening along an area extending longitudinally along and parallel to the slot die opening and in a direction transversely of the movement of the film emerging from the film head thin slot die opening to locate the profiles in a desired position relative to each other and longitudinally relative to said die opening and to the edges of the film;

flexibly accommodating said tubes to any adjusted position of the die blocks to which connected;

and cooling the fused film and profiles.

28. The method of continuously forming film having fastener profiles in accordance with the steps of claim 27:

supplying plastic to said film head and to said profile die blocks from separate sources and separately controlling the rates of flow of plastic.

29. The method of continuously forming film having fastener profiles in accordance with steps of claim 27:

including separately independently controlling the temperature of plastic extruded through the slot die opening and extruded through the profile die blocks.

30. The method of continuously forming fastener profile film which comprises:

extruding film from a film head having a thin slot die opening; separately extruding a shaped profile from a preform profile die block at a location so that the profile will engage the film while the plastic of the film and profile are still in a state of fusion and will fuse to each other;

supplying said die block with fused plastic through a flexible supply tube connected to the die block;

adjustably positioning the location of the die block in a direction laterally across the movement of the film emerging from the film head to locate the profile in a desired position longitudinally along and relative to the slot die opening and relative to the edges of the film;

flexibly accommodating said tube to any adjusted position of the die block;

and cooling the fused film and profile.

31. The method of continuously forming fastener profile film in accordance with the steps of claim 30:

supplying plastic to said film head and to said profile die block from separate sources and separately controlling the rate of flow of plastic.

32. The method of continuously forming fastener profile film in accordance with the steps of claim 30:

including separately independently controlling the temperature of plastic extruded through a slot die opening and extruded through the profile die block.

33. The method of continuously forming fastener profile film in accordance with the steps of claim 30:

including changing the length of the thin slot die opening by changing the effective location of the edge of the thin slot.

34. The method of continuously forming fastener profile film which comprises:

extruding film from a film head having a thin slot die opening;

separately extruding a shaped profile from a preform profile die block at a location so that the profile will engage the film while the plastic of the film and profile are still in a state of fusion and will fuse to each other;

adjustably positioning the location of the die block in a direction transversely of the movement of the film emerging from the film head to locate the profile in a selected one of a plurality of primary general positions relative to said slot die opening and relative to the edges of the film;

adjustably shifting the die block into a secondary position within said selected one primary general position;

and cooling the fused film and profile.

35. The method of claim 34, comprising effecting both said primary general adjustable positioning and said secondary adjustable shifting of the die block in the direction of the length of said thin slot die opening.

* * * * *